United States Patent [19]

Ulmer

[11] 4,365,296

[45] Dec. 21, 1982

[54] SYSTEM FOR CONTROLLING THE DURATION OF THE TIME INTERVAL BETWEEN BLOCKS OF DATA IN A COMPUTER-TO-COMPUTER COMMUNICATION SYSTEM

[75] Inventor: Siegfried W. Ulmer, Cagnes, France

[73] Assignee: International Business Machines Corp., Armonk, N.Y.

[21] Appl. No.: 187,122

[22] Filed: Sep. 15, 1980

[30] Foreign Application Priority Data

Sep. 28, 1979 [FR] France ............................. 79 24578

[51] Int. Cl.³ .......................................... G06F 3/00
[52] U.S. Cl. ............................................... 364/200
[58] Field of Search .................. 364/200 MS File; 179/18 ES

[56] References Cited

U.S. PATENT DOCUMENTS 3,587,044 6/1971 Jenkins ............................. 364/200

Primary Examiner—Mark E. Nusbaum
Assistant Examiner—Thomas M. Heckler
Attorney, Agent, or Firm—John B. Frisone

[57] ABSTRACT

System for controlling the duration of the time interval between the blocks of data transmitted by a computer 1. A channel 7 transfers the first block to be transmitted to a control unit 2 which sends same over a line 4 through a modem 3. When the block has been transmitted, the unit 2 signals the channel accordingly and receives therefrom a command specifying the duration of the time interval between the blocks. The unit 2 activates interval timing means and signals the channel 7 when the time interval has elapsed. The channel can then send the second block to the unit 2.

4 Claims, 7 Drawing Figures

START I/O

CCW

CAW

CSW

SYSTEM FOR CONTROLLING THE DURATION OF THE TIME INTERVAL BETWEEN BLOCKS OF DATA IN A COMPUTER-TO-COMPUTER COMMUNICATION SYSTEM

DESCRIPTION

1. Technical Field

This invention relates to computer-to-computer communication systems wherein the computers exchange blocks of data at high speed through a transmission medium and, more particularly, to a system for controlling the duration of the time interval between two consecutive data blocks transmitted by a computer.

2. Background Art

In communication systems of this type, a so-called master data station is connected through a transmission medium to one or more so-called slave data stations. Generally, a data station includes a computer connected to the transmission medium through a front-end communication unit consisting, for example, of a communication control unit or a front-end processor. The master data station exchanges successive data blocks with the slave data station(s).

For maximum efficiency, the successive data blocks sent by the transmitting station should be separated by as short a time interval as possible, provided, however, that the resultant spacing is not such as to prevent the computer associated with the receiving station from processing all of the incoming data blocks, thereby causing many blocks to be lost. This may occur, in particular, if that computer has insufficient resources in buffers or in CPU cycles, due, for example, to the fact that it is handling several applications simultaneously. Many data blocks can also be lost if the computers respectively associated with the transmitting station and with the receiving station operate at different speeds, for example, if they are the types of computers used respectively in the IBM System/360 and in the IBM System/370.

In the prior art, the timing facilities that exist in most commercially available computers are used to provide adequate spacing between the consecutive data blocks.

However, the use of the timing facilities in the computer associated with the transmitting data station has two main disadvantages. Firstly, it calls for a considerable number of CPU cycles. Secondly, it precludes the utilization of highly effective techniques, such as the command chaining technique for transferring data between main storage and the channel associated with the computer.

DISCLOSURE OF INVENTION

Accordingly, it is the object of this invention to provide a system for controlling the duration of the time interval between consecutive data blocks transmitted by a computer in a communication system which does not require the use of the timing facilities available in the computer and allows the dynamic command chaining technique to be utilized.

Generally, in the system of the present invention, the computer at the transmitting end transfers the first data block to the associated front-end unit through which it is connected to the transmission medium. The front-end unit sends the first data block over the transmission medium and signals the computer accordingly. The computer then sends to the front-end unit a so-called Count Down command specifying the duration of the time interval which must elapse before the next data block is transmitted. The front-end unit decodes this command and sets timing means defining an interval equal to that specified by the Count Down command. When this time interval has elapsed, the front-end unit signals the computer and the computer transfers the second data block thereto.

In accordance with an embodiment of the invention, the Count Down command is contained in a channel command word and specifies the duration of the time interval between consecutive data blocks.

In another embodiment of the invention, the Count Down command is included in a channel command word that also contains the main storage address where the number of time units defining the interval between data blocks is stored. The channel sends to the front-end unit the Count Down command and the number of time units supplied by main storage.

In still another embodiment of the invention, assuming that the computer wants to transmit N data blocks and that only n main storage areas containing the first n data block are available with $2 \leq n < N$, the other data blocks being stored in an external storage, the computer sends the first data block, then the Count Down command to the front-end unit. When the front-end unit signals that the time interval specified by the Count Down command has elapsed, the computer sends the second data block to the front-end unit and causes the $(n+1)^{th}$ data block to be transferred from external storage to the main storage area that has been freed as a result of the transmission of the first data block. The other data blocks in external storage are successively transferred to the main storage areas thus freed and are sent to the front-end unit to be transmitted in a similar manner.

The foregoing and other objects, features and advantages of the invention will be apparent from the following more particular description of a preferred embodiment of the invention, as illustrated in the accompanying drawings.

BEST MODE FOR CARRYING OUT THE INVENTION

Figure 1:
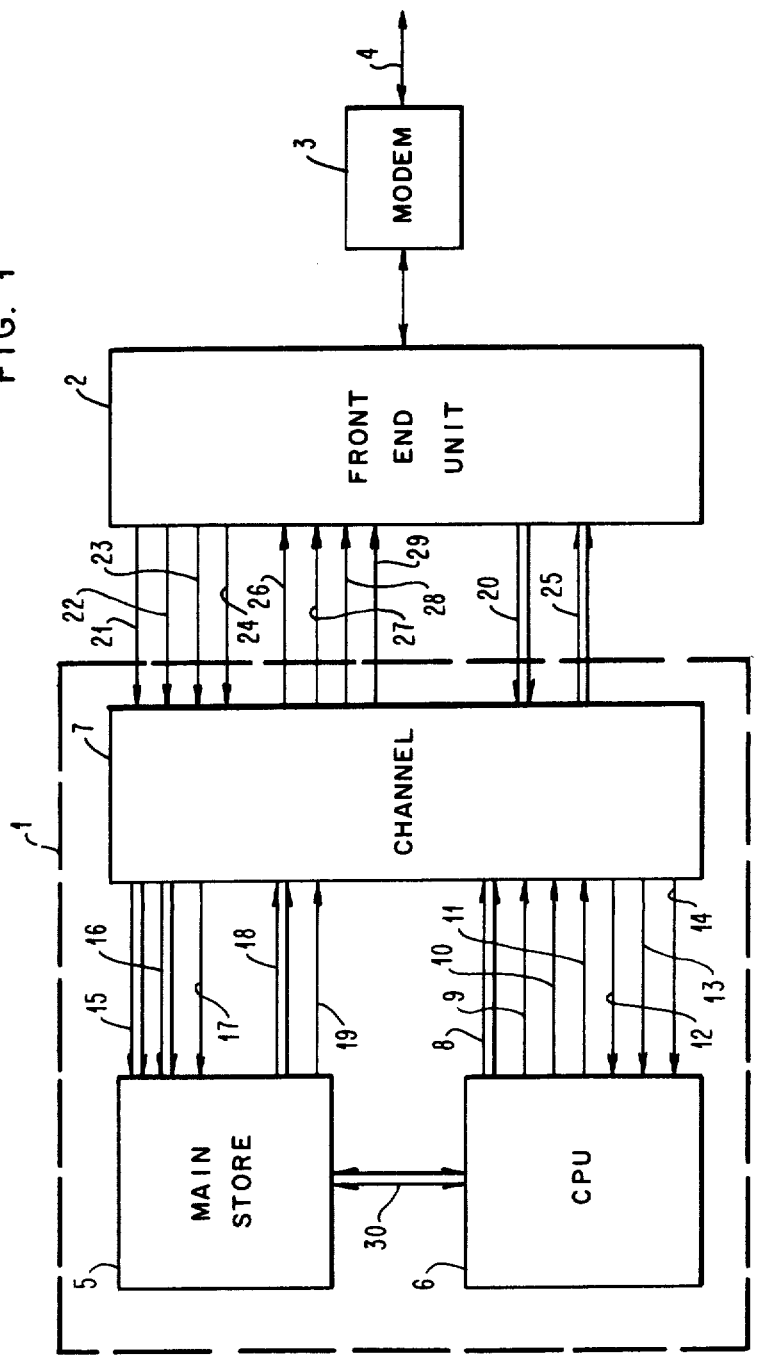
FIG. 1 illustrates a data station incorporating the present invention.

Referring now to FIG. 1, a block diagram of a data station incorporating the invention is shown. The data station includes a computer 1, a front-end communication unit 2 which, in the exemplary embodiment described herein, is a communication control unit, and a modem 3 which connects the data station to a transmission medium represented in the figure as a transmission line 4. The computer 1 may be similar to that used in the IBM System/360 or in the IBM System/370, and only those elements thereof which are helpful in understanding the invention have been shown in the figure. These elements consist of a main storage 5, a central processing unit (CPU) 6 and a channel 7.

The CPU 6 includes facilities for addressing main storage, for fetching and storing information, for arithmetic and logical processing of data, for sequencing instructions in the desired order, and for initiating communications between main storage and the external units connected thereto.

The channel 7 controls transfer of data between the main storage 5 and remote data stations connected to the data station of FIG. 1 via the transmission line 4. The channel 7 connects with the CPU 6, the main storage 5 and the control unit 2.

The channel relieves the CPU of the burden of communicating directly with the remote data stations and permits data processing in the computer 1 to proceed concurrently with input/output (I/O) operations.

I/O operations involve the transfer of information between main storage and the remote data stations. The control unit 2 controls the exchange of data between the station of FIG. 1 and the remote data stations, and includes the logical circuits and buffers required for this purpose.

The modem 3 converts the data pulses provided by the control unit 2 into signals that can be sent over the transmission medium and vice versa.

In what follows, the CPU 6 and the main storage 5, which may consist, for example, of the corresponding hardware used in the IBM System/360 or in the IBM System/370, will not be described since extensive literature exists on these units. The channel 7 is connected to the CPU 6, the main storage 5 and the control unit 2 through various buses and control lines. For clarity, only those buses and control lines which are necessary for the purposes of the present description have been shown in FIG. 1.

CONNECTIONS BETWEEN THE CHANNEL AND THE CPU

From the CPU to the channel:
Address bus 8:
  This bus is used to transmit the address of the selected I/O device.
Start line 9:
  This line is used to signal the start of an I/O operation.
Channel Selection line 10:
  This line is used to cause the channel to initiate an I/O operation.
Interruption line 11:
  This line is used to cause the interruption of a current I/O operation.
From the channel to the CPU:
Status lines 12 and 13:
  These lines are used to indicate the status of the channel.
Interruption Request line 14:
  This line is used to signal to the CPU that the channel is requesting an interruption of the current I/O operation.

CONNECTIONS BETWEEN THE CHANNEL AND MAIN STORAGE

From the channel to main storage:
Bus 15:
  This bus is used to transmit addresses to main storage.
Bus 16:
  This bus is used to transmit data to main storage.
Write Request line 17:
  This line is used to signal that the channel requests the transfer thereto of the content of the storage location addressed by bus 15.
From main storage to the channel:
Bus 18:
  This is the main storage data output bus.
Address Accepted line 19:
  This line is used to signal that the address present on bus 15 has been accepted.

CONNECTIONS BETWEEN THE CHANNEL AND THE CONTROL UNIT

From the control unit to the channel:
Bus 20:
  This is the input bus to the channel.
Operational In line 21:
  This line is used to signal that the control unit has been selected and is communicating with the channel.
Address In line 22:
  This line is used to signal when an address has been placed on bus 20 by the control unit.
Status In line 23:
  This line is used to signal that a status indication has been placed on bus 20 by the control unit.
Service In line 24:
  This line is used to signal to the channel when the control unit wants to transmit or receive an 8-bit byte.
From the channel to the control unit:
Bus 25:
  This is the output bus from the channel.
Command Out line 26:
  This line is used to signal that a command has been placed on bus 25 by the channel.
Address Out line 27:
  This line is used to signal that an address has been placed on bus 25 by the channel.
Service Out line 28:
  This line is used to signal that the channel has accepted the information present on bus 20 or has provided on bus 25 the information requested through Service In.
Select Out line 29:
  This line is used to select the control unit.

CONNECTIONS BETWEEN THE CPU AND MAIN STORAGE

These connections are not relevant to the description of the invention and have been represented by a bidirectional bus 30.

Before describing in detail the station of FIG. 1 and its operation, a brief description of the formats of the instructions and control words being utilized will be given.

Figure 2:
FIG. 2 shows the format of a Start I/O instruction.

Referring now to FIG. 2, there is shown the format of the Start I/O instruction used by the CPU to initiate an I/O operation.

The Start I/O instruction is comprised of 32 bits.

Bit positions 0-7 define the operation code specifying the Start I/O instruction. Bit positions 8-15 are ignored.

Bit positions 16-23 contain the channel address, while bit positions 24-31 identify the control unit and the addressed remote station.

Figure 3:
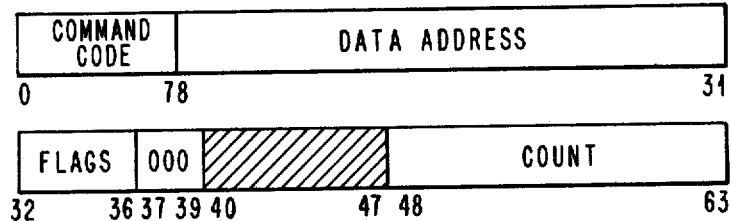
FIG. 3 shows the format of a channel command word (CCW).

Referring next to FIG. 3, the format of a channel command word (CCW) is shown. This 64-bit word specifies the command to be executed and for commands initiating I/O operations it designates the storage area associated with the operation and the action to be taken whenever data transfer to or from that area is completed.

The fields in the CCW are allocated for the following purposes:

Command Code: Bits 0–7 specify the operation to be performed.

Data Address: Bits 8–31 specify the address of an 8-bit byte in main storage. It is the first storage location referred to in the area designated by the CCW.

Chain-Data (CD) Flag: Bit 32, when "1", specifies chaining of data. The storage area designated by the next CCW will then be used with the current operation.

Chain Command (CC) Flag: When bit 33 is "1" and bit 32 is "0", chaining of commands is specified, in which case the operation identified by the command code in the next CCW is initiated upon normal completion of the current operation.

Suppress-Length-Indication (SLI) Flag: Bit 34 controls whether an incorrect length condition is to be indicated to the program. When this bit is "1" and the CD flag is "0" in the last CCW used, the incorrect length indication is suppressed. When both the CC and SLI flags are "1", command chaining takes place regardless of the presence of an incorrect length condition.

Skip (SKIP) flag: This bis (bit 35), when "1", specifies suppression of transfer of information to storage during a read, read backward, or sense operation.

Program-Controlled-Interruption (PCI) Flag: This bit (bit 36), when "1", causes the channel to generate an interruption condition when the CCW takes control of the channel. When this bit is "0", normal operation takes place.

Count: Bits 48–63 specify the number of 8-bit byte locations in the storage area designated by the CCW.

Bit positions 37–39 contain zeros. The content of bit positions 40–47 is ignored.

Figure 4:
FIG. 4 shows the format of a channel address word (CAW).

Referring next to FIG. 4, there is shown the format of the channel address word (CAW). This word specifies the storage protection key and the address of the first CCW associated with the instruction Start I/O. It is assigned a fixed address in main storage.

The fields of the CAW are allocated for the following purposes:

Protection Key: Bits 0–3 form the protection key for all commands associated with Start I/O. This key is compared with a key in storage whenever reference is made to a main storage area.

Command Address: Bits 8–31 designate the location of the first CCW in main storage.

Figure 5:
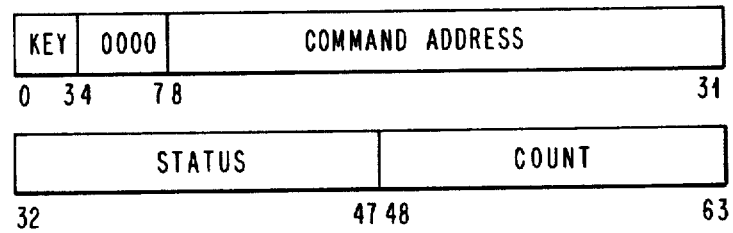
FIG. 5 shows the format of a channel status word (CSW).

Referring next to FIG. 5, there is shown the format of the channel status word (CSW). The CSW provides to the program the status of an I/O device or the condition under which an I/O operation has been terminated. The CSW is formed, or parts of it are replaced, in particular, in the process of I/O interruptions and during execution of Start I/O.

The CSW is placed in main storage at a fixed address and is available to the program at this address until the time the next I/O interruption occurs or until another I/O instruction causes its content to be replaced.

The fields in the CSW are allocated for the following purposes:

Protection Key: Bits 0–3 form the protection key in storage used in the chain of operations.

Command Address: Bits 8–31 form the address, which is eight higher than the address of the last CCW used.

Status: Bits 32–47 identify the conditions in the device and the channel that caused the storing of the CSW.

Count: Bits 48–63 form the residual count for the last CCW used.

The formats described with reference to FIGS. 2 to 5 are those used in the computers associated with the IBM System/360 and IBM System/370. For more details, reference to the IBM document entitled "IBM System/370—Principles of Operation," Form GA22-7000-5, File No. S/370-01, is suggested.

The operation of the data station of FIG. 1, which incorporates the present invention, will now be described. Since the invention relates to a system for controlling the duration of the time interval between consecutive data blocks transmitted by a given station, only the transmission mode of operation of the station will be described.

This mode of operation corresponds to a Write I/O operation. A first embodiment of the invention will now be described.

It will be assumed that the application program being executed in the computer 1 wants to transmit two data blocks from main storage 5 to a remote data station. Each data block comprises a predetermined number of 8-bit bytes and is placed in a main storage area.

The application program causes the information required in connection with the transmission of the first data block and with the minimum duration of the time interval between the two data blocks to be placed in two channel command words designated CCW1 and CCW2. This information is as follows:

| CCW1: | |
|---|---|
| Commande Code: | Write. |
| Data Address: | Address of the first location in the storage area that contains the first data block to be transmitted. |
| CD Flag: | 0 |
| CC Flag: | 1 |
| SLI Flag: | 1 |
| SKIP Flag: | Ignored |
| PCI Flag: | 0 |
| Count: | Number of 8-bit byte locations in the storage area that contains the first data block to be transmitted. |
| CCW2: | |
| Command Code: | The application program causes the code for a command designated Count Down command (CDC), which specifies the duration of the interval between the first and the second data blocks, to be set in this field. In the first embodiment of the invention, the CDC code may be, for example, AA AA AA 11, in which the last two bits ("1", "1") specify a Count Down command and the six "A" bits represent the number of time units making up the interval. In what follows, this CDC will be termed |

-continued

| | "Count Down command of the first type". |
|---|---|
| Data Address: | Ignored. |
| CD Flag: | 0 |
| CC Flag: | 0 |
| SLI Flag: | 1 |
| SKIP Flag: | Ignored |
| PCI Flag: | 0 |
| Count: | 1 |

The application program sets the channel address, the control unit address and the remote station address in the instruction Start I/0, the CCW1 address in the address field of the CAW, and transfers control of the operations to the supervisory program, which initiates transmission of the first data block by executing an instruction Start I/O. The CPU 6 responds to this instruction by raising Start line 9 and Channel Selection line 10, and by placing the address contained in Start I/O on Address bus 8. The channel 7 detects the condition of lines 9 and 10 and, if busy, signals that fact to the CPU 6 by placing an appropriate condition code on Status lines 12 and 13.

If the channel is not busy, it stores the address present on Address bus 8 and requests main storage to send the CAW by raising Write Request line 17 and placing the address of the CAW on bus 15. Main storage 5 places the CAW on bus 18 and raises Acceptance line 19. The channel causes the address of the CCW1 contained in the CAW to be stored in a command address register. The channel then requests main storage 5 to transfer the CCW1 thereto by raising Write Request line 17 and placing the address of the CCW1 on bus 15. Main storage 5 transfers the CCW1 to the channel, which stores the contents of the Data Address, Flags and Count fields in appropriate registers and increments by eight the address stored in its command address register.

The channel 7 sends the device address it received from CPU 6 to the control unit by placing the address on output bus 25 and raising Address Out line 27 and Select Out line 29. Control unit 2 detects the condition of lines 27 and 29, decodes the device address and, if it accepts same, raises Operational In line 21 and Address In line 22 and places the device address on input bus 20. The channel compares the device address received from the control unit with that received from the CPU and, if they match, sends the command code in the CCW1 to control unit 2 by placing same on output bus 25 and raising Command Out line 26. If it accepts the command, the control unit raises Status In line 23 and places zero status information on input bus 20. In response thereto, the channel frees the CPU by placing the appropriate condition code on status lines 12 and 13.

Transmission of the first data block now begins. If the transmission procedure used is the so-called "High Level Data Link Control" (HDLC) procedure, the control unit, when it detects the Write command, places a frame delimiting sequence on the transmission line and then requests the channel to provide the first 8-bit byte of the first block to be transmitted by raising Service In line 24. In response thereto, the channel raises Write Request line 17, places on bus 15 the data address contained in the CCW1, increments this address by one, and decrements the content of its count register by one. The first 8-bit byte is placed on data output bus 18 by main storage and is transmitted to the control unit via output bus 25 by the channel which raises Service Out line 28. The control unit transmits this byte, then requests the channel to provide the second byte, and so forth, until the content of the count register associated with the channel becomes zero. At this time, when the control unit raises Service In line 24, the channel responds by raising Command Out line 26, thereby signaling a stop condition to the control unit. In response, the control unit successively places on the transmission line the above-mentioned sequence and a frame check sequence, both of which are provided for in the HDLC procedure, raises Status In line 23, and places the conditions Channel End and Device End on the input bus. The channel then checks the value of the CC flag in the CCW1 and, since this bit is "1", specifying chaining of commands, the channel requests main storage to transfer thereto the CCW2 whose address is contained in the command address register associated with the channel.

Main storage 5 transfers the CCW2 to the channel, which stores same and selects control unit 2 as described earlier. The channel transfers the CCW2 command code to the control unit, which decodes same as a Count Down command of the first type and loads the six A bits in the left-hand portion of the command code into a count down counter. The content of this counter is decremented at a predetermined rate and, when it is at a count of zero, the control unit raises Status In line 23 and places Channel End and Device End on input bus 20. In response thereto, the channel checks the value of the CC flag in the current CCW, i.e., CCW2, and since this bit is "0", it initiates a request to CPU 6 for an I/O interruption by raising Interruption Request line 14, and waits for CPU 6 to raise Interruption line 11. The channel then places on data input bus 16 the conditions which caused the operation to be interrupted in order that the appropriate CSW bits may be set accordingly.

Control is now turned over to the supervisory program. This program determines which application program requested the I/O operation just completed and transfers control thereto. The application program then initiates transmission of the second data block, which takes place in the same manner as that of the first data block.

The above description of the operation of the first embodiment of the invention shows the manner in which the duration of the time interval between two data blocks transmitted consecutively can be controlled. The operation of a second embodiment, in which no interruption occurs after the first data block has been transmitted, will now be described.

As in the case of the first embodiment, it will be assumed that the application program wants to transmit two data blocks from main storage to a remote station. The application program causes the information required in connection with the transmission of the two data blocks to be placed in four channel command words designated CCW1-CCW4.

This information is as follows:

| CCW1: | |
|---|---|
| Command code: | Write |
| Data Address: | Address of the first storage location that contains the first data block. |
| CC Flag: | 1 |
| Other Flags: | Same as in the CCW1 of the first embodiment. |
| Count: | Number of 8-bit byte locations in the storage area that contains the |

| | |
|---|---|
| | first data block. |
| CCW2: | |
| Command code: | Count Down, AA AA AA 11 |
| Data Address: | Ignored |
| CC Flag: | 1 |
| Other Flags & Count: | Same as in the CCW1 of the first embodiment. |
| CCW3: | |
| Command Code: | Write |
| Data Address: | Address of the first storage area location that contains the second data block. |
| CC Flag: | 1 |
| Other Flags: | Same as in the CCW1 of the first embodiment. |
| Count: | Number of 8-bit byte locations in the storage area that contains the second data block. |
| CCW4: | |
| Command Code: | Count Down |
| Data Address: | Ignored |
| Other Flags & Count: | Same as in the CCW2 of the first embodiment. |

The first data block is transmitted in the same manner as in the first embodiment. When the channel receives the Channel-End and Device-End conditions from the control unit upon the count specified by the Count Down command in the CCW2 reaching zero, it checks the value of the CC flag in the CCW2, and since this bit is "1", the channel requests main storage to transfer the CCW3 thereto. The handling by the channel of the CCW3 and CCW4 is identical to that of the CCW1 and CCW2 in the first embodiment, and results in the second data block being transmitted.

In the first two embodiments of the invention whose operation has been described above, the number of time units associated with the Count Down command was specified by the command code itself. In a third embodiment of the invention, the number of time units is placed in main storage.

It will be assumed by way of example that, as in the first embodiment, the application program wants to transmit two data blocks. Accordingly, the program places the information required in connection with the transmission of the first data blocks and with the duration of the time interval between the blocks, in two channel command words, CCW1 and CCW2, as follows:

| | |
|---|---|
| CCW1: | Identical to the CCW1 of the first embodiment. |
| CCW2 | |
| Command Code: | Count Down. In this embodiment, this code may be, for example, MM MM MM 01. In what follows, this will be termed "Count Down Command of the second type". |
| Data Address: | Address of the first location in the storage area that contains the number of time units making up the interval between the data blocks. |
| All Flags: | 0 |
| Count: | Number of 8-bit byte locations defining the |

| | |
|---|---|
| | number of time units. |

The CCW1 is handled by the channel in the same manner as in the first embodiment. When the CCW2 is transferred from main storage to the channel, the channel transfers the command code in the CCW2 to the control unit, which decodes same as a Count Down command of the second type and requests the channel to transfer thereto from main storage the 8-bit bytes that define the number of time units. The channel requests main storage to transfer thereto the contents of the addresses specified by the bits in the Data Address and Count fields of the CCW2. After it has received these bytes, the control unit loads them into its count down counter, whose count will then be decremented as described earlier.

Having explained how the invention can be used to transmit a couple of data blocks from main storage to a remote data station, we shall now describe the manner in which it can be employed to transmit a large number N of data blocks, using only n main storage areas, with $2 \leq n < N$. In the example given below, we shall show how N blocks can be transmitted using only two main storage areas.

To transmit the N data blocks, the application program provides five channel command words, CCW1-CCW5, whose contents are summarized in the following table:

| | Command Code | Data Address | Flags | Count |
|---|---|---|---|---|
| CCW1 | Write | Address of Area 1 | CC | Length of Area 1 |
| CCW2 | Count Down | Ignored | CC, SLI, PCI | 1 |
| CCW3 | Write | Address of Area 2 | CC | Length of Area 2 |
| CCW4 | Count Down | Ignored | SLI, PCI | 1 |
| CCW5 | TIC | Address of CCW1 | Ignored | Ignored |

Only those flags which are ones have been shown in the table. The transfer-in-channel (TIC) command specifies the address of the next CCW to be fetched and used by the channel. This command initiates the execution of a CCW that is not located at the CCW address immediately following that of the current CCW.

It will be assumed that the first two data blocks to be transmitted are located in main storage areas 1 and 2 and that the remaining data blocks are stored in an external storage connected to the computer. The application program places the address of the CCW1 in the Address field of the CAW. The CCW1 is executed and the CCW2 is fetched from main storage as described in connection with the first embodiment of the invention.

After the CCW2 has been stored in the channel, the channel beings to execute it and simultaneously checks the value of the PCI flag. Since this bit is "1", the channel raises Interruption Request line 14. When the CPU raises Interruption line 11, the channel places in main storage the channel status word (CSW) indicating the PCI condition. This condition is detected by the application program, which is thus informed that the CCW1 has been executed, i.e., that the first data block has been transmitted and that main storage area 1 is now available. The application program then requests the channel, which is connected to the external storage (not shown), to supply the third data block to be transferred from external storage to main storage area 1. The application program places the length of the third data block in the Count field of the CCW1 in main storage and sets the CC flag in the CCW4 to "1".

Meanwhile, the CCW2 and CCW3 are executed and the CCW4 is transferred to the channel. The channel begins the execution of the CCW4, determines that the PCI flag is "1", and requests an interruption. The application program thereupon causes the fourth data block to be transferred from external storage to main storage area 2 and updates the Count field of the CCW4 in main storage.

Upon completion of the execution of the CCW4 stored in the channel, that is, when the second data block has been transmitted, the channel checks the value of the CC flag. If this bit is "0", this means that transfer of the third data block to area 1, has not yet been completed, and the transmission operation is terminated. If this bit is "1", the channel requests main storage to transfer the CCW5 thereto. Upon detecting the TIC command, the channel requests main storage to transfer the CCW1 whose address is contained in the CCW5. The channel again executes the CCW1, resulting in the third data block being transferred, then executes the CCW2, thereby causing the fifth data block to be transferred from external storage to main storage area 2, and so forth, until all N data blocks have been transmitted. When using n main storage areas, the $(n+1)^{th}$ data block is transferred from external storage to storage area 1 as soon as this area is freed, and so on.

Figure 6:
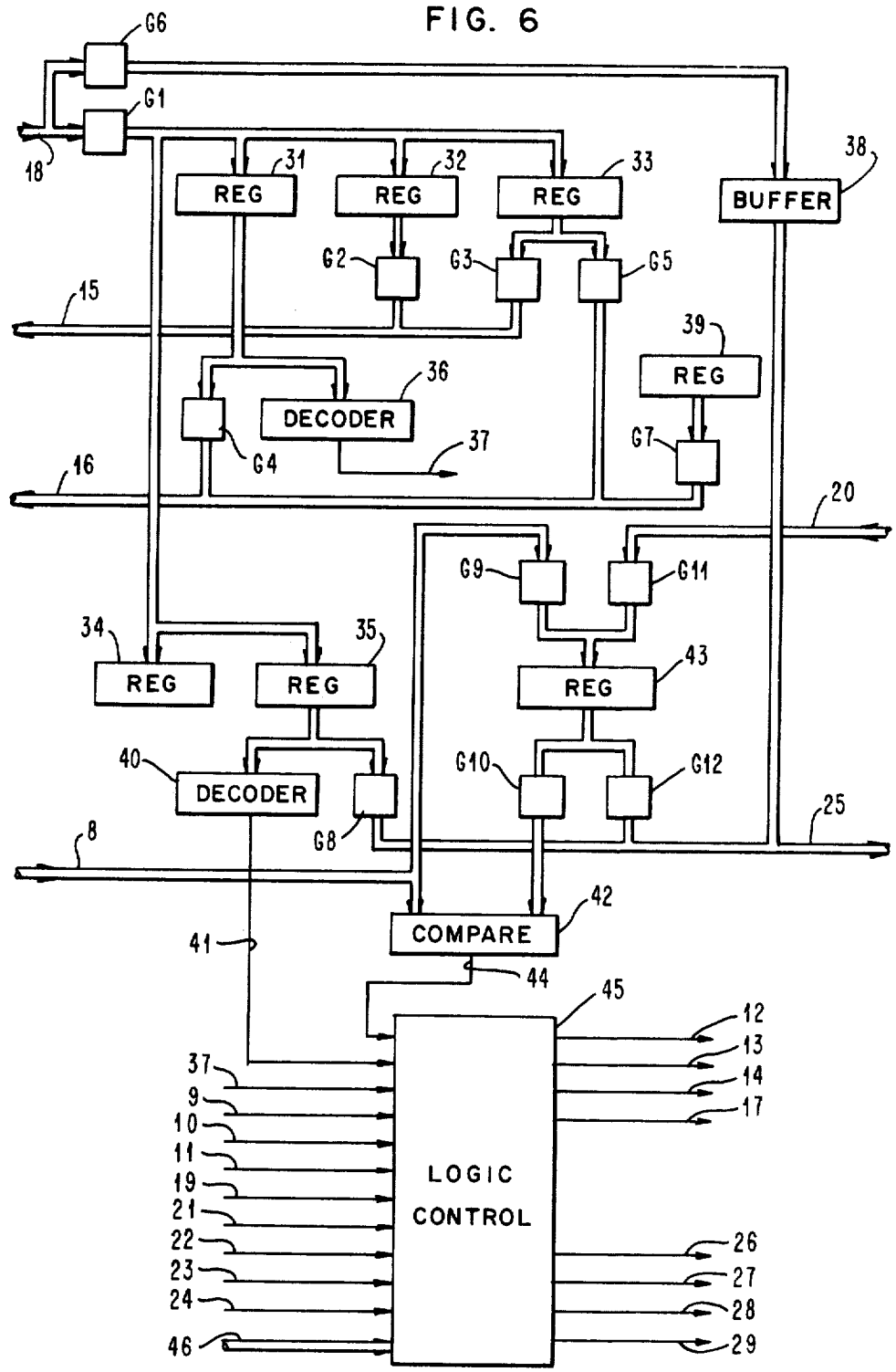
FIG. 6 illustrates an exemplary embodiment of the channel 7 of FIG. 1.

Referring now to FIG. 6, there is shown an exemplary embodiment of the channel 7 of FIG. 1. The channel illustrated in FIG. 6 is a simplified version of the channel described in U.S. Pat. No. 3,488,633, "Automatic Channel Apparatus," of L. E. King et al., assigned to this assignee reference to which is suggested.

The main storage data output bus 18 is connected through a gate G1 to a Count register 31, a Data Address register 32, a Command Address register 33, a Flag bits register 34, and a Command code register 35. The outputs of registers 32 and 33 are respectively connected through a pair of gates, G2 and G3, to the main storage address bus 15. The outputs of registers 31 and 33 are respectively connected through a pair of gates, G4 and G5, to the main storage data input bus 16. The output of register 31 is further connected to a decoder 36, which provides a signal on a line 37 whenever the content of register 31 is zero. The bus 18 is further connected through a gate G6 to the input of a data buffer 38 which has its output connected to output bus 25. A channel status register 39 has its output connected to bus 16 through a gate G7. The output of register 35 is connected to a decoder 40, which provides a signal on a line 41 whenever the command code stored in register 35 is a Write code, and also to output bus 25 through a gate G8. The address bus 8 is connected to an input of a comparator 42 and, through a gate G9, to the input of a unit address register 43 which has its output connected through a gate G10 to the other input of comparator 42, which provides a match signal on a line 44 whenever its two inputs are identical. The input of register 43 is also connected through a gate G11 to input bus 20. The output of register 43 is further connected through a gate G12 to output bus 25. A logic control circuit 45 receives as inputs the lines 9–11, 19, 21–24 and 37, the content of the status register 39 via a bus 46, the write line 41, the match line 44, and the flag bits stored in register 34 via lines not shown. The outputs of circuit 45 consist of the lines 12, 13, 14, 17, 26–29 and the control lines of gates G1–G12, which have not been illustrated.

The operation of the device illustrated in FIG. 6 will now be described with reference to the first embodiment of the invention, the operation of which has been explained above. Control circuit 45 will not be described in detail because it may consist of a straightforward arrangement of gates and latches responsive to the various inputs for indicating the various output conditions, as will be apparent from the following description of the operation of the device of FIG. 6. At the beginning of the transmission operation performed by the channel, the CPU 6 raises lines 9 and 10 and places the unit address on address bus 8. The control circuit 45 detects the condition of lines 9 and 10 as well as the channel status information present on bus 46, and, if the channel is not busy, places an appropriate condition code, such as 00, on Status lines 12 and 13 and raises the control line of gate G9, which is thus enabled. The unit address present on bus 8 is thus loaded into unit address register 43 and into an input register (not shown) of comparator 42. Circuit 45 then raises Write Request line 17 and the control line of gate G3, thereby causing the address of the CAW contained in command address register 33 to be placed on main storage address bus 15. When main storage 5 raises Acceptance line 19, circuit 45 raises the control line of gate G1, and the address contained in the CAW, which address is available on main storage data output bus 18, is stored in register 33. Circuit 45 then raises Write Request line 17 and the control line of gate G3, and places on bus 15 the address stored in register 33. When main storage responds by raising Acceptance line 19, circuit 45 raises the control line of gate G1, and the contents of the Command Code, Data Address, Flag and Count fields of the CCW1 present on bus 18 are respectively stored in registers 35, 32, 34 and 31. Circuit 45 then raises Address Out line 27, Select Out line 29 and the control line of gate G12, thereby causing the unit address in register 43 to be placed on output bus 25. When control unit 2 raises Operational In line 21 and Address In line 22, circuit 45 raises the control line of gate G11, thereby causing the address on input bus 20 to be stored in register 43. Circuit 45 then raises the control line of gate G10, and the unit address supplied by control unit 2 is compared with that provided by the CPU and available in the input register of comparator 42. If the two addresses are identical, comparator 42 raises match line 44. Circuit 45 detects the condition of line 44 and raises Command Out line 26 and the control line of gate G8, thereby causing the command code to be placed on output bus 25. When the control unit raises Status In line 23, the control circuit 45 raises the control line of a gate not shown and the status information present on the input bus is loaded into channel status register 39. Circuit 45 responds to this status information by placing the appropriate code on Status lines 12 and 13. Transmission of the first data block now begins. When control unit 2 raises Service In line 22, control circuit 45 raises Write Request line 17 and the control line of gate G2, thereby causing the address contained in data address register 32 to be placed on bus 15. When main storage 5 responds by raising Acceptance line 19, circuit 45 raises the control line of gate G6, thus enabling the requested 8-bit byte to be placed on output bus 25 through buffer register 38, causes the counts of registers 31 and 32 to be decremented and incremented by one, respectively, by means not shown, and raises the Service Out line 28. The other 8-bit bytes of the first data block are transferred in a similar manner.

When the content of register 31 becomes zero, decoder 36 raises line 37, and when control unit 2 requests another 8-bit byte by raising Service In line 24, control circuit 45 raises Command Out line 26, thereby signaling a stop condition to the control unit. When received by the channel, the Channel-End and Device-End conditions are stored in status register 39. Upon detecting these conditions, circuit 45 checks the value of the CC and PCI flags. If the CC flag bit is "1", circuit 45 places on main storage address bus 15 the contents of register 33, previously increased by 8 (a CCW has a length of eight 8-bit bytes). If the CC flag bit is "0", or if the PCI flag bit is "1", circuit 45 raises Interruption Request line 14. When the CPU raises Interruption line 11, circuit 45 raises the control lines of gates G4, G5 and G7, thereby transferring the contents of registers 31, 33 and 39 to main storage data input bus 16 to be placed in the CSW.

Figure 7:
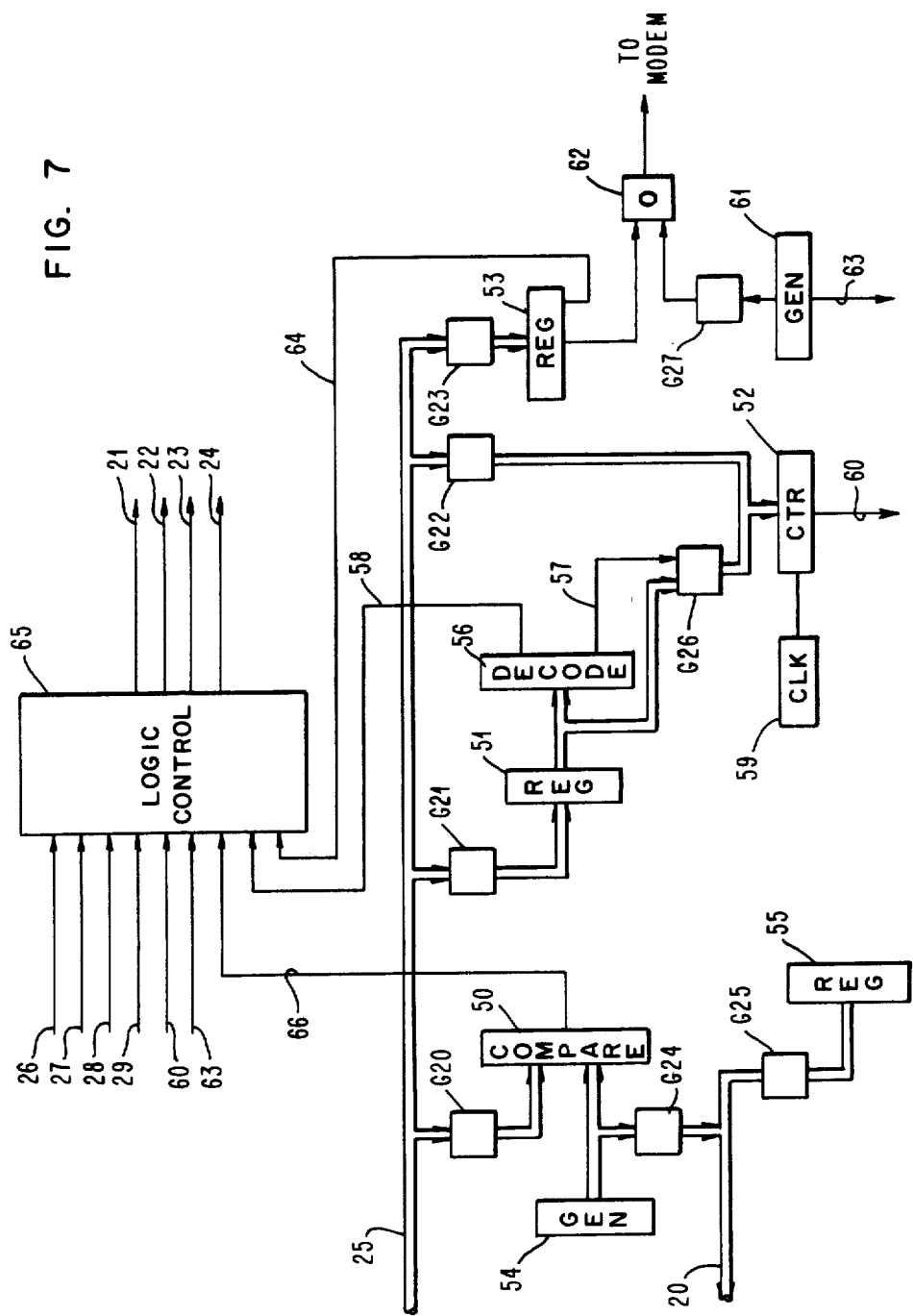
FIG. 7 illustrates an exemplary embodiment of the control unit 2 of FIG. 1.

Referring next to FIG. 7, there is shown an exemplary embodiment of the control unit 2 of FIG. 1. The control unit illustrated in FIG. 7 is a simplified version of the IBM 2701 Data Adapter Unit which has been adapted to incorporate the present invention. For a more detailed discussion of the IBM 2701 Data Adapter Unit, reference may be made to the IBM literature and, in particular, to the document entitled "Component Description: IBM 2701 Data Adapter Unit," File No. 2701-02, Form GA 22-6864-5.

The output bus 25 from channel 7 is connected through gates G20-G23 to one of the inputs of a comparator 50, to a command code register 51, to a count down counter 52 and to a serializer register 53. An address generator 54 has its output connected to the other input of comparator 50 and, through a gate G24, to channel input bus 20. Input bus 20 is also connected through a gate G25 to the output of a status register 55. Register 51 has its output connected to a decoder 56 which supplies a signal on a line 57 whenever the command involved is a Count Down command of the first type and another signal on a line 58 whenever the command is a Count Down command of the second type. Line 57 is connected to the control input of a gate G26, which also receives as inputs the six low-order bits contained in register 51. The output of gate G26 is connected to count down counter 52, which receives input pulses from a clock 59.

Counter 52 provides a signal on line 60 when it is at a count of zero. A sequence generator 61 has its output connected through a gate G27 to an input of an OR gate 62, the other input of which is connected to the output of serializer 53. The output from OR gate 62 is sent to modem 3 for transmission over line 4 (FIG. 1). Sequence generator 61 provides a signal on a line 63 after it has generated the frame-delimiting sequences. Serializer 53 provides a signal on a line 64 when the content of its register is zero. A logic control circuit 65 receives as inputs lines 26-29, 58, 60, 63, 64, the output line 66 from comparator 50, and the output line from decoder 56. The outputs of circuit 65 comprise lines 21-24 and the control lines of gates G20-G25 and G27. As control circuit 45 of FIG. 6, the control circuit 65 may consist of a straightforward arrangement of gates and latches responsive to the various inputs for indicating the various output conditions, as will be apparent from the following description.

The operation of the device of FIG. 7 will now be described in relation to the invention discussed earlier.

The control unit is activated when channel 7 raises Address Out line 27 and Select Out line 29 and places the unit address on output bus 25. Control circuit 65 detects the condition of lines 27 and 29 and raises the control line of gate G20, thereby allowing the unit address present on bus 25 to be applied to comparator 50 and compared with the unit address generated by device 54. If the two addresses match, comparator 50 raises line 66, and circuit 65 responds by raising Operational In line 21 and Address In line 22 as well as the control line of gate G24, thereby placing the unit address generated by device 54 on input bus 20. When channel 7 raises Command Out line 26 and places the command code on output bus 25, circuit 65 raises the control line of gate G21, thereby transferring the command code to register 51.

When decoder 56 detects a Write command code, it signals control circuit 65, which raises the control line of gate G27, and sequence generator 61 generates the frame-delimiting sequence which is sent to the modem through OR gate 62. Circuit 65 then raises Service In line 24 and the control line of gate G23. After the first 8-bit byte of the data block to be transmitted has been placed on output bus 25 by channel 7, this byte is stored in the register of serializer 53, and is then sent to the modem serially by bit at the bit transmission rate. When the content of its register is zero, serializer 53 raises line 64 and circuit 65 again raises Service In line 22 and the control line of gate G23 to enable transmission of the second 8-bit byte, and so on. When circuit 65 raises line 22 and the channel responds by raising Command Out line 26, thereby indicating a stop condition, circuit 65 raises the control line of gate G27 and generator 61 generates the frame-delimiting sequence and the frame check sequence. After these sequences have been transmitted, circuit 65 raises Status In line 23 and the control line of gate G25, thereby enabling the content of Status register 55, in which the Channel-End and Device-End conditions have been placed, to be transferred to input bus 20.

When decoder 56 detects a Count Down command code AA AA AA 11, it raises line 57, which controls the gate G26, and the six A bits of the code are loaded into count down counter 52. The count of counter 52 is decremented under control of pulses generated by the oscillator 59 and when it becomes zero, the counter raises line 60. Circuit 65 detects the condition of line 60 and raises Status In line 23 and the control line of gate G25, thereby allowing the content of status register 55, in which the Channel-End and Device-End conditions have been placed, to be transferred to input bus 20.

When decoder 56 detects a Count Down command code of the second type, it signals circuit 65, which raises the Service In line 24 and the control line of gate G22. When channel 7 places on output bus 25 the first 8-bit byte defining the number of time units between consecutive data blocks, this byte is loaded into count down counter 52. Circuit 65 again raises Service In line 24 to request the next 8-bit byte, which is then loaded into counter 52, and so on. When circuit 65 raises Service In line 24 and the channel responds by raising Command Out line 26, which indicates that all 8-bit bytes defining the number of units that make up the time interval between data blocks have been loaded, the count of the count down counter begins to be decremented. When the counter is at a count of zero, the Channel-End and Device-End conditions are transferred to the channel as explained earlier.

While the invention has been particularly shown and described with reference to a preferred embodiment thereof, it will be understood by those skilled in the art that numerous changes in form and detail may be made therein without departing from the spirit and scope of the invention.

Having thus described my invention, what I claim as new, and desire to secure by Letters Patent, is:

1. In a communication system of the type that comprises a computer connected to a transmission medium through a front-end communication unit and which transmits data blocks separated from each other by an interval, a system for controlling the duration of said interval, characterized in that it comprises:

transfer means located in the computer for sending a first data block to the front-end unit, means located in the front-end unit for sending said first data block over the transmission medium, end means located in the front-end unit for sending to the computer a first end indication that said first data block has been transmitted, means located in the computer for sending to the front-end unit, in response to said first indication, a command specifying the duration of the time interval which is to separate the transmission of said first data block from that of a next data block, timing means located in the front-end unit, and means located in the front-end unit for decoding said command and activating said timing means to cause same to determine a time interval whose duration is equal to that specified by said command, said end means being caused to send to the computer a second end indication when the time interval determined by said timing means has expired, and said transfer means being responsive to said second end indication for sending a second data block to the front-end unit, in order that said second block may be sent over the transmission medium by said front-end unit.

2. In a communication system of the type that comprises a computer connected to a transmission medium through a front-end communication unit and which transmits N data blocks separated from each other by an interval, said computer including a main storage wherein the first n data blocks to be transmitted are respectively stored in n areas, with n being an integer higher than or equal to 2 and lower than N, with the remainder of said N data blocks being stored in an external storage, a system for controlling the duration of the interval between blocks, characterized in that it includes:

transfer means located in the computer for transferring successively the data blocks stored in said main storage from said main storage to the front-end unit;

means located in the front-end unit for sending the data block received from said main storage over the transmission medium;

end means located in the front-end unit for sending to the computer an end indication after each of said data blocks has been transmitted means located in the computer responsive to the end indication sent by said end means after the first data block has been transmitted for sending to the front-end unit a command specifying the duration of the interval which is to separate the transmission of said first data block from that of a next data block, timing means located in the front-end unit, means located in the front-end unit for decoding said command and activating said timing means to cause same to determine a time interval whose duration is equal to that specified by said command, said end means being caused to send an end indication to the computer when said time interval has expired, and said transfer means being responsive to the last recited end indication for transferring a second data block from said main storage to the front-end unit; and means located in the computer for transferring the $(n+1)^{th}$ data block from external storage to the first area of main storage, when said first data block has been transmitted by the front-end unit, the remaining ones of said N data blocks in external storage being successively transferred to the freed areas of main storage and send to the front-end unit to be transmitted in a similar manner.

3. A system according to claim 1 or 2 wherein the computer includes a central processing unit, a main storage and a channel which connects the computer to the front-end unit and is controlled by channel command words, characterized in that said command is included in a channel command word and specifies the number of time units making up the interval between the blocks.

4. A system according to claim 1 or 2 wherein the computer includes a central processing unit, a main storage and a channel which connects the computer to the front-end unit and which is controlled by channel command words, characterized in that said command is included in a channel command word that further contains the main storage address where the number of time units making up the interval between the blocks is stored and in that the channel sends to the front-end unit both this command and the number of time units transferred from main storage.

* * * * *